United States Patent
Jia et al.

(10) Patent No.: US 11,113,548 B2
(45) Date of Patent: *Sep. 7, 2021

(54) OBJECT DETECTION NEURAL NETWORKS

(71) Applicant: Waymo LLC, Mountain View, CA (US)

(72) Inventors: Zhaoyin Jia, Sunnyvale, CA (US); Ury Zhilinsky, Foster City, CA (US); Yun Jiang, Sunnyvale, CA (US); Yimeng Zhang, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,754

(22) Filed: Jun. 10, 2019

(65) Prior Publication Data

US 2019/0294896 A1 Sep. 26, 2019

Related U.S. Application Data

(63) Continuation of application No. 15/383,648, filed on Dec. 19, 2016, now Pat. No. 10,318,827.

(51) Int. Cl.
*G06K 9/00* (2006.01)
*G06K 9/46* (2006.01)
(Continued)

(52) U.S. Cl.
CPC ..... *G06K 9/00805* (2013.01); *G06K 9/00369* (2013.01); *G06K 9/4628* (2013.01);
(Continued)

(58) Field of Classification Search
CPC ........... G06K 9/00805; G06K 9/00369; G06K 9/6288; G06K 9/4628; G06N 3/084; G06N 3/0454; G06N 3/00
See application file for complete search history.

(56) References Cited

U.S. PATENT DOCUMENTS 10,318,827 B2 6/2019 Jia et al.
10,467,459 B2 * 11/2019 Chen .................. G06K 9/00228
(Continued)

OTHER PUBLICATIONS

Erhan et al. "Scalable object detection using deep neural networks," Proceedings of the IEEE Conference on Computer Vision and Pattern Recognition, 2014, pp. 2147-2154.

*Primary Examiner* — Solomon G Bezuayehu
(74) *Attorney, Agent, or Firm* — Fish & Richardson P.C.

(57) ABSTRACT

Methods, systems, and apparatus, including computer programs encoded on computer storage media, for generating object detection predictions from a neural network. In some implementations, an input characterizing a first region of an environment is obtained. The input includes a projected laser image generated from a three-dimensional laser sensor reading of the first region, a camera image patch generated from a camera image of the first region, and a feature vector of features characterizing the first region. The input is processed using a high precision object detection neural network to generate a respective object score for each object category in a first set of one or more object categories. Each object score represents a respective likelihood that an object belonging to the object category is located in the first region of the environment.

18 Claims, 6 Drawing Sheets

(51) Int. Cl.
  *G06K 9/62* (2006.01)
  *G06N 3/08* (2006.01)
  *G06N 3/04* (2006.01)
  *G06N 3/00* (2006.01)

(52) U.S. Cl.
  CPC ............. *G06K 9/6288* (2013.01); *G06N 3/00* (2013.01); *G06N 3/0454* (2013.01); *G06N 3/084* (2013.01)

(56) References Cited

U.S. PATENT DOCUMENTS

| | | | |
|---|---|---|---|
| 2002/0186864 A1 | 12/2002 | Rundle et al. | |
| 2009/0010495 A1* | 1/2009 | Schamp | B60R 21/0134 |
| | | | 382/106 |
| 2014/0275824 A1* | 9/2014 | Couse | G16H 40/60 |
| | | | 600/301 |
| 2016/0180195 A1 | 6/2016 | Martinson et al. | |
| 2017/0046613 A1* | 2/2017 | Paluri | G06N 3/0454 |
| 2017/0053169 A1 | 2/2017 | Cuban et al. | |
| 2017/0200063 A1* | 7/2017 | Nariyambut Murali | |
| | | | G06K 9/6227 |
| 2017/0206426 A1* | 7/2017 | Schrier | G06K 9/6273 |
| 2017/0262962 A1* | 9/2017 | Rad | G06T 3/4046 |
| 2017/0270374 A1* | 9/2017 | Myers | G06K 9/00369 |
| 2017/0287137 A1* | 10/2017 | Lin | G06N 3/08 |
| 2018/0039848 A1 | 2/2018 | Konolige et al. | |
| 2018/0136000 A1 | 5/2018 | Rasnnusson, Jr. et al. | |
| 2018/0150684 A1* | 5/2018 | Wang | G06K 9/6256 |
| 2018/0157939 A1* | 6/2018 | Butt | H04N 21/44 |
| 2018/0173971 A1 | 6/2018 | Jia et al. | |
| 2019/0057314 A1* | 2/2019 | Julian | G06N 5/043 |
| 2021/0089040 A1* | 3/2021 | Ebrahimi Afrouzi | |
| | | | B25J 9/1676 |

\* cited by examiner

OBJECT DETECTION NEURAL NETWORKS

CROSS-REFERENCE TO RELATED APPLICATION

This is a continuation of U.S. application Ser. No. 15/383,648, filed on Dec. 19, 2016, the disclosure of which is considered part of and is incorporated by reference in the disclosure of this application.

FIELD

This specification relates to autonomous vehicles.

BACKGROUND

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more filters, which are defined by parameters of the layer. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Generally, convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use object detection predictions for making driving decisions.

Autonomous vehicle systems can make object detection predictions using human-programmed logic. The human-programmed logic specifies precisely how the outputs of on-board sensors should be combined, transformed, and weighted, in order to compute a full-vehicle prediction.

SUMMARY

In some implementations, an autonomous or semi-autonomous vehicle is capable of using a high precision object detection neural network to automatically identify and classify objects of interest in an environment around the vehicle. Examples of objects include pedestrians, cyclists, or other vehicles. Laser and camera sensors of the vehicle initially capture a top-down projected laser image and a camera image, respectively, to characterize the environment surrounding the vehicle. The sensor data is pre-processed and provided as input to the object detection neutral network to identify candidate regions in the environment that satisfy a set of criteria associated with object detection. The candidate regions are then analyzed to identify and/or verify predicted objects within the candidate regions. The output of the object detection neural network can include a list of detected objects and for each detected object, respective object scores reflecting likelihoods that the detected object belongs to the object categories.

Particular embodiments of the subject matter described in this specification can be implemented so as to realize one or more of the following advantages. An autonomous or semi-autonomous vehicle system can use a fully-trained neural network subsystem to classify objects corresponding to pedestrians or cyclists. The system can use techniques to improve the accuracy of the predictions. The system can also process sensor data through specific neural network subsystems to reduce computational resources required to generate accurate object predictions. For example, confidence scores of object scores for predicted objects using a lower precision neural network can be used to determine if additional processing is required. In response determining that the values of the confidence scores satisfy a threshold value, a higher-precision neural network can be used to further process sensor data to improve object prediction accuracy.

The system can also detect objects with both "high precision" and "high recall" phases that are efficient enough to be executed in "real time" for the purposes of automatic driving. For instance, as described below, the system uses a neural network architecture that includes a "high recall" phase that initially generates object candidates, and a "high precision" phase that then uses more accurate (e.g., higher precision and higher recall) classifiers to generate a high precision object detection result with minimal loss of recall. In the high recall phase, the system processes sensor data quickly with lower accuracy, while in the high precision phase, the system processes the output of the high recall phase at a slower speed but with higher accuracy. The neural networks described throughout can be trained end-to-end to produce effective performance.

In addition, the system can be applied to process data from different kinds of sensors, e.g., LADAR, and video cameras, and can combine the data from different sensors to improve overall object detection performance.

In one general aspect, a method includes: obtaining an input characterizing a first region of an environment. The input includes: (i) a projected laser image generated from a three-dimensional laser sensor reading of the first region; (ii) a camera image patch generated from a camera image of the first region; and (iii) a feature vector of features characterizing the first region. The method further includes processing the input using a high precision object detection neural network to generate a respective object score for each object category in a first set of one or more object categories. Each object score represents a respective likelihood that an object belonging to the object category is located in the first region of the environment. Processing the input further includes: processing the projected laser image through a laser sub-neural network to generate an alternative representation of the projected laser image; processing the camera image patch through a camera sub-neural network to generate an alternative representation of the camera image patch; processing the feature vector through a feature sub-neural network to generate an alternative representation of the feature vector; and processing the alternative representation of the projected laser image, the alternative representation of the camera image patch, and the alternative representation of the feature vector through a combining sub-neural network to generate the respective object score for each of the one or more object categories.

One or more implementations may include the following optional features. For example, in some implementations, the environment is an environment in proximity of an autonomous vehicle. The three-dimensional laser sensor reading and the camera image are captured by sensors of the autonomous vehicle.

In some implementations, the combining sub-neural network is configured to: process the alternative representation of the laser projected image and the alternative representation of the camera image patch through one or more visual combining neural network layers to generate a visual combined representation; process the visual combined representation and the alternative representation of the feature vector through one or more final combining layers to generate a final combined representation; and process the final combined representation through an output neural network layer to generate the object scores.

In some implementations, the method further includes: obtaining a camera image of the environment; and processing the camera image using a first high-recall object detection neural network. The first object detection neural network is configured to: receive the camera image; and process the camera image to generate: (i) data defining a plurality of bounding boxes in the camera image; and (ii) for each of the plurality of bounding boxes, a respective first confidence score that represents a likelihood that an object belonging to an object category from a second set of one or more object categories is present in the region of the environment shown in the bounding box.

In some implementations, the method further includes: generating a plurality of camera image patches from the obtained camera image of the environment; determining a respective size value for each of the plurality of camera image patches; adjusting the respective size values for each of the plurality of camera image patches to generate a plurality of range-normalized camera image patches, where the values of the respective sizes for each of the plurality of range-normalized camera image patches are substantially similar; and processing the plurality of range-normalized camera image patches using the first high-recall object detection neural network.

In some implementations, the method further includes: obtaining a projected laser image of the environment; processing the projected laser image using a second high-recall object detection neural network. The second high-recall object detection neural network is configured to: receive the projected laser image; and process the projected laser image to generate: (i) data defining a plurality of bounding boxes in the projected laser image; and (ii) for each of the plurality of bounding boxes, a respective second confidence score that represents a likelihood that an object belonging to an object category from the second set of one or more object categories is present in the region of the environment shown in the bounding box.

In some implementations, the method further includes: obtaining respective top-down projections of a plurality of channels of the input characterizing the first region of the environment, each top-down projection representing a projection of an area surrounding the autonomous vehicle; and combining the respective top-down projections to generate the projected laser image.

In some implementations, the method further includes: determining, from the first confidence scores and the second confidence scores, that additional processing is required to determine a higher-precision confidence score for the first region, and in response, obtaining the first input characterizing the first region and processing the first input using the high precision object detection neural network.

In some implementations, the projected laser image is generated from a three-dimensional laser sensor reading collected by a long-range laser sensor.

In some implementations, the projected laser image is generated from a three-dimensional laser sensor reading collected by a short-range laser sensor.

In some implementations, the one or more object categories include at least a pedestrian category and a cyclist category.

In some implementations, the obtained input characterizing the first region of the environment comprises a multiplexed signal, and processing the input using a high precision object detection neural network comprises processing each subcomponent of the obtained input to generate a respective object score for a particular object category, where each subcomponent of the obtained input corresponds to a different object category.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use one or more fully-learned neural networks to automatically detect objects of certain object categories in an environment surrounding the vehicle. Each object category can specify an object type that is commonly within a vicinity of the vehicle as it travels on a road. For example, object categories can represent pedestrians, cyclists, or other vehicles within a proximity to the vehicle.

As used in throughout this description, a "fully-learned" machine learning model is a model that is trained to compute a desired prediction. In other words, a fully-learned model generates an output based solely on being trained on training data rather than on human-programmed decisions.

Figure 1:
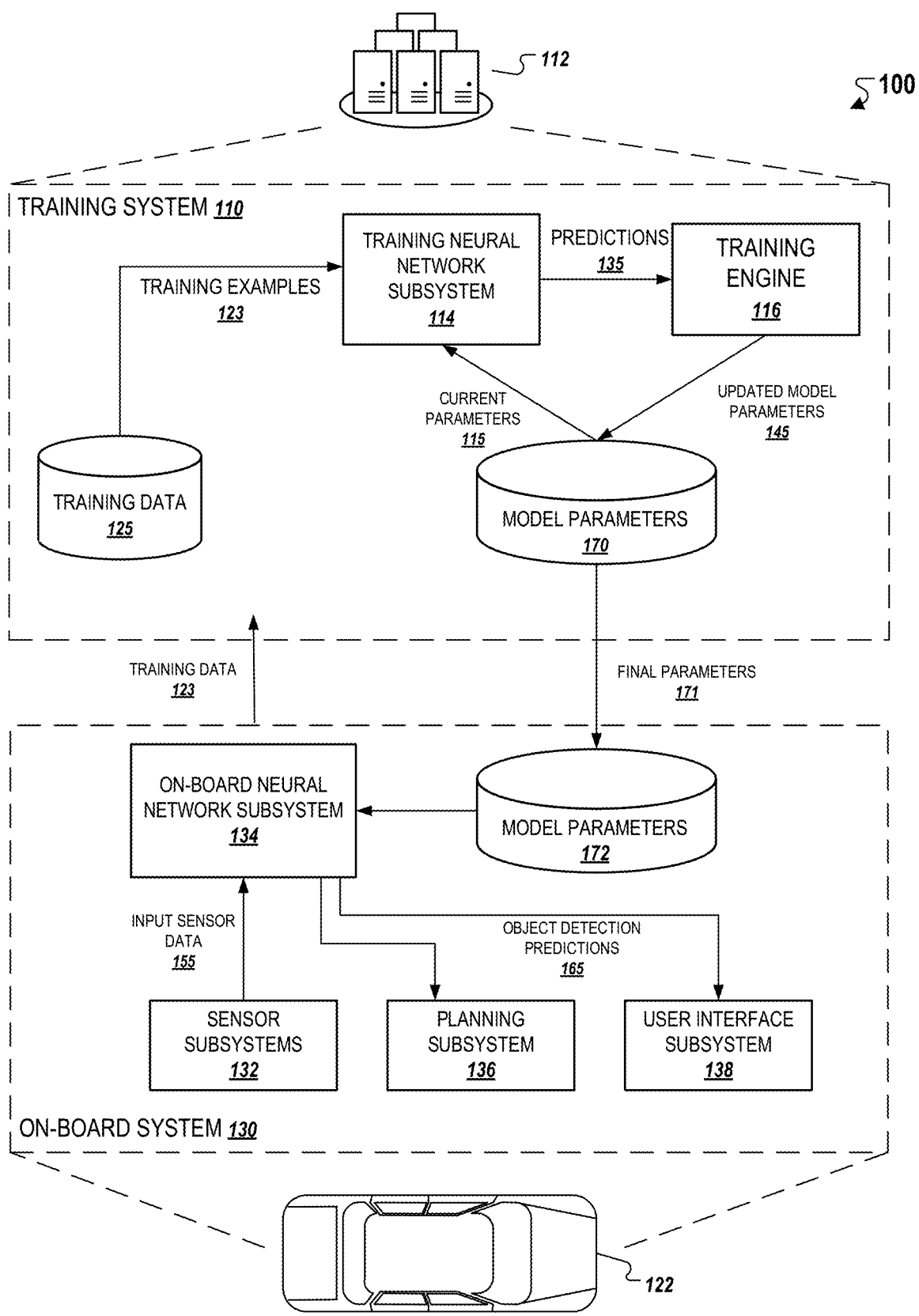
FIG. 1 is a block diagram of an example of a system.

FIG. 1 is a diagram of an example system 100. The system 100 includes a training system 110 and an on-board system 130.

The on-board system 130 is physically located on-board a vehicle 122. The vehicle 122 in FIG. 1 is illustrated as an automobile, but the on-board system 130 can be located on-board any appropriate vehicle type. The vehicle 122 can be a fully autonomous vehicle that uses object detection predictions to inform fully-autonomous driving decisions. The vehicle 122 can also be a semi-autonomous vehicle that uses object detection predictions to aid a human driver. For example, the vehicle 122 can autonomously apply the brakes if a full-vehicle prediction indicates that a human driver is about to collide with a detected object, e.g., a pedestrian, a cyclist, another vehicle.

The on-board system 130 includes one or more sensor subsystems 132. The sensor subsystems include a combination of components that receive reflections of electromagnetic radiation, e.g., LIDAR systems that detect reflections of laser light, radar systems that detect reflections of radio waves, and camera systems that detect reflections of visible light.

The sensor subsystems can also include combinations of short-range and long-range laser sensors. For example, a short-range laser sensor can be used to detect the ground surrounding vehicle 122 and nearby objects within 40 meters from the vehicle 122. In another example, a long-range laser sensor can be used to detect objects up to 80 meters around the vehicle 122.

The raw input sensor data indicates a distance, a direction, and an intensity of reflected radiation. Each sensor can transmit one or more pulses of electromagnetic radiation in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 provide input sensor data 155 to an on-board neural network subsystem 134. The input sensor data 155 can include multiple channels of data, where each channel represents a different characteristic of reflected electromagnetic radiation. Thus, multiple channels of input sensor data 155 can be generated from measurements from the same sensor.

The sensor subsystems 132, the on-board neural network subsystem 134, or some combination of both, transform raw sensor data into the multiple channels of input sensor data 155. To do so, the on-board system 130 can project the various characteristics of the raw sensor data into a common coordinate system. The various characteristics of the raw sensor data, and their respective representations, will be discussed in more detail below with reference to FIG. 3.

The on-board neural network subsystem 134 implements the operations of each layer of a set of neural networks that are trained to make predictions related to object detection, i.e., related to detecting objects in the environment surrounding the vehicle. Thus, the on-board neural network subsystem 134 includes one or more computing devices having software or hardware modules that implement the respective operations of each layer of the neural networks according to an architecture of the neural networks. The object detection neural networks are described in more detail below with reference to FIGS. 2-4B.

The on-board neural network subsystem 134 can implement the operations of each layer of a neural network by loading a collection of model parameters 172 that are received from the training system 110. Although illustrated as being logically separated, the model parameters 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural networks. For example, some operations of some layers may be performed by highly parallelized hardware, e.g., by a graphics processing unit or of another kind of specialized computing device. In other words, not all operations of each layer need to be performed by central processing units (CPUs) of the on-board neural network subsystem 134.

The on-board neural network subsystem 134 uses the input sensor data 155 to generate one or more object detection predictions 165. The on-board neural network subsystem 134 can provide the one or more object detection predictions 165 to a planning subsystem 136, a user interface subsystem 138, or both.

When a planning subsystem 136 receives the one or more object detection predictions 165, the planning subsystem 136 can use the one or more object detection predictions 165 to make fully-autonomous or semi-autonomous driving decisions. For example, the planning subsystem 136 can generate a fully-autonomous plan to navigate through or around other vehicles on a highway while also avoiding cyclists and pedestrians. As another example, the planning subsystem 136 can generate a semi-autonomous recommendation for a human driver to apply the brakes.

A user interface subsystem 138 can receive the object detection predictions 165 and can generate a user interface presentation that indicates the locations of nearby objects. For example, the user interface subsystem 138 can generate a user interface presentation having image or video data containing a representation of the regions of space that are likely to be occupied by objects. An on-board display device can then display the user interface presentation for passengers of the vehicle 122.

The on-board neural network subsystem 134 can also use the input sensor data 155 to generate training data 123. The training data 123 can include the projected representations of the different channels of input sensor data. The on-board system 130 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make object detection predictions from input sensor data. The training neural network subsystem 114 includes a plurality of computing devices having software or hardware modules that implement the respective operations of each layer of the neural network according to an architecture of the neural network.

The training neural networks generally have the same architecture as the on-board neural networks. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current values of parameters 115 stored in a collection of model parameters 170. Although illustrated as being logically separated, the model parameters 170 and the software or hardware modules performing the operations may actually be located on the same computing device or on the same memory device.

The neural network subsystem 114 can receive training examples 123 as input. The training examples 123 can include auto-labeled training data, human-labeled training data, or some combination of the two. Each of the training examples 123 includes a representation of the different channels of input sensor data as well as one or more labels that indicate the location of objects within regions of space represented by the input sensor data. For example, the training examples 123 can include input sensor data for reference objects that are predetermined to be associated with different object categories, e.g., pedestrians, cyclists. In some implementations, training examples 123 can include multiple objects for each object category.

The training neural network subsystem 114 can generate, for each training example 123, one or more object detection predictions 135. A training engine 116 analyzes the object detection predictions 135 and compares the object detection predictions to the labels in the training examples 123. The training engine 116 then generates updated model parameter values 145 by using an appropriate updating technique, e.g., backpropagation. The training engine 116 can then update the collection of model parameters 170 using the updated model parameter values 145.

After training is complete, the training system 110 can provide a final set of model parameter values 171 to the on-board system 130 for use in making fully autonomous or semi-autonomous driving decisions. The training system 110 can provide the final set of model parameter values 171 by a wired or wireless connection to the on-board system 130.

Figure 2:
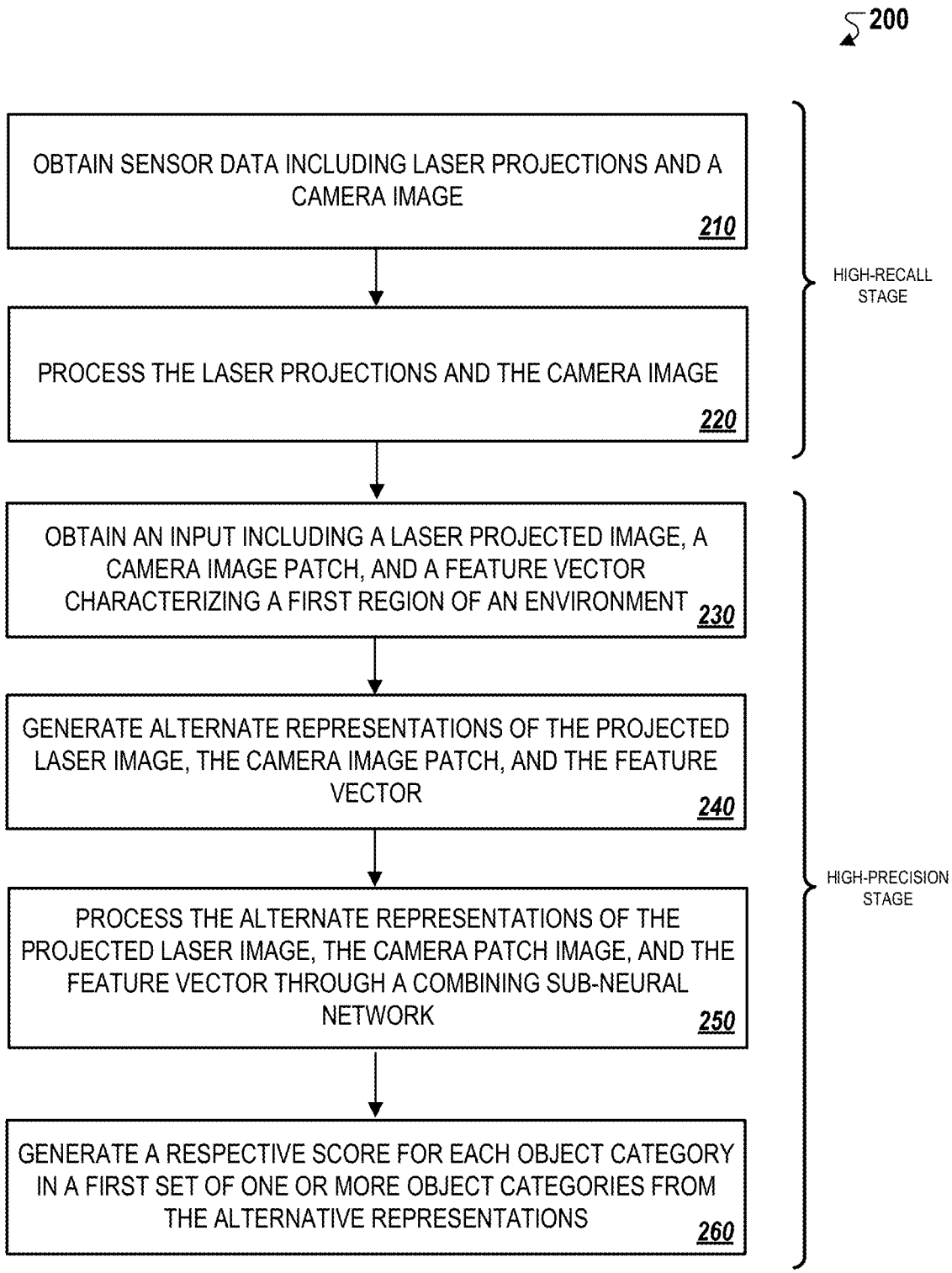
FIG. 2 is a flow chart of an example of a process for performing high precision object detection for an environment in proximity of an autonomous vehicle.

FIG. 2 is a flow chart of an example of a process 200 for performing high precision object detection for an environment in proximity of an autonomous vehicle. For convenience, the process 200 will be described as being performed by a system of one or more computers located in one or more locations. For example, a neural network system, e.g., the on-board system 130 of FIG. 1, appropriately programmed in accordance with this specification, can perform the process 200.

Figure 3A:
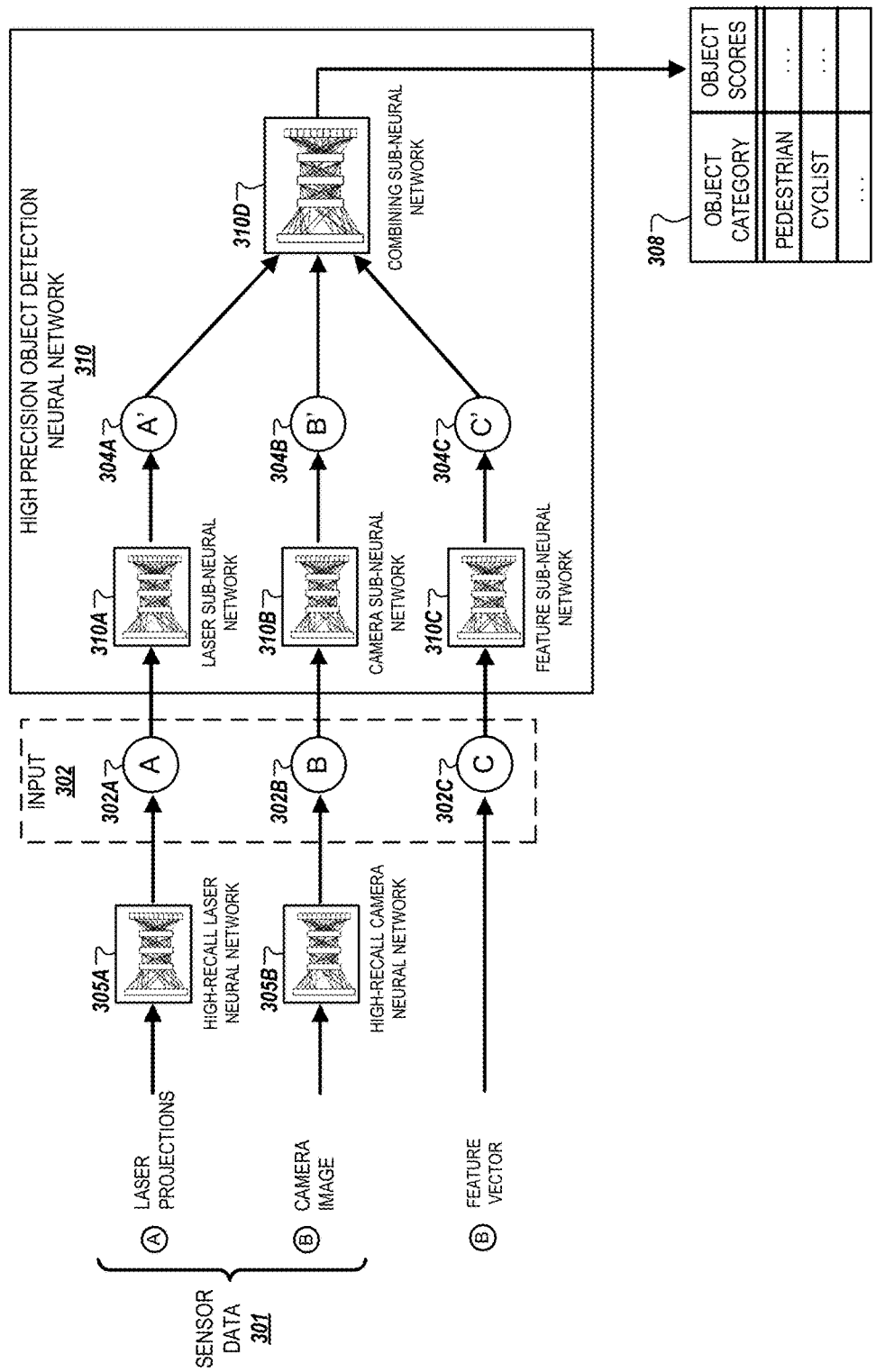
FIG. 3A is a schematic diagram of an example of an architecture of a high precision object detection neural network.

In general, the neural network system performs the objection detection techniques described throughout using a two-stage neural network architecture depicted in more detail in FIG. 3A. During an initial "high recall" stage, the system processes raw sensor data to generate data that the system then processes in a "high precision" stage. The system performs the operations of the process 200 within the high precision stage based on input that represents the output of the high recall stage.

Briefly, the process 200 can include obtaining sensor data including laser projections and a camera image (210), processing the laser projections and the camera image (220), obtaining an input characterizing a first region of an environment (230), generating alternate representations of a projected laser image, a camera image patch, and a feature vector (240), processing the alternate representations of the projected laser image, the camera image patch, and the feature vector through a combining sub-neural network (250), and generating a respective score for each object category in a set of one or more object categories (260).

In more detail, the system obtains sensor data including laser projections and a camera image (210). For instance, as illustrated in FIG. 3A, sensor data 301 includes laser projections generated from a three-dimensional laser sensor reading of a first region of an environment surrounding an autonomous vehicle. The sensor data 301 also includes a camera image of the first region.

Figure 4A:
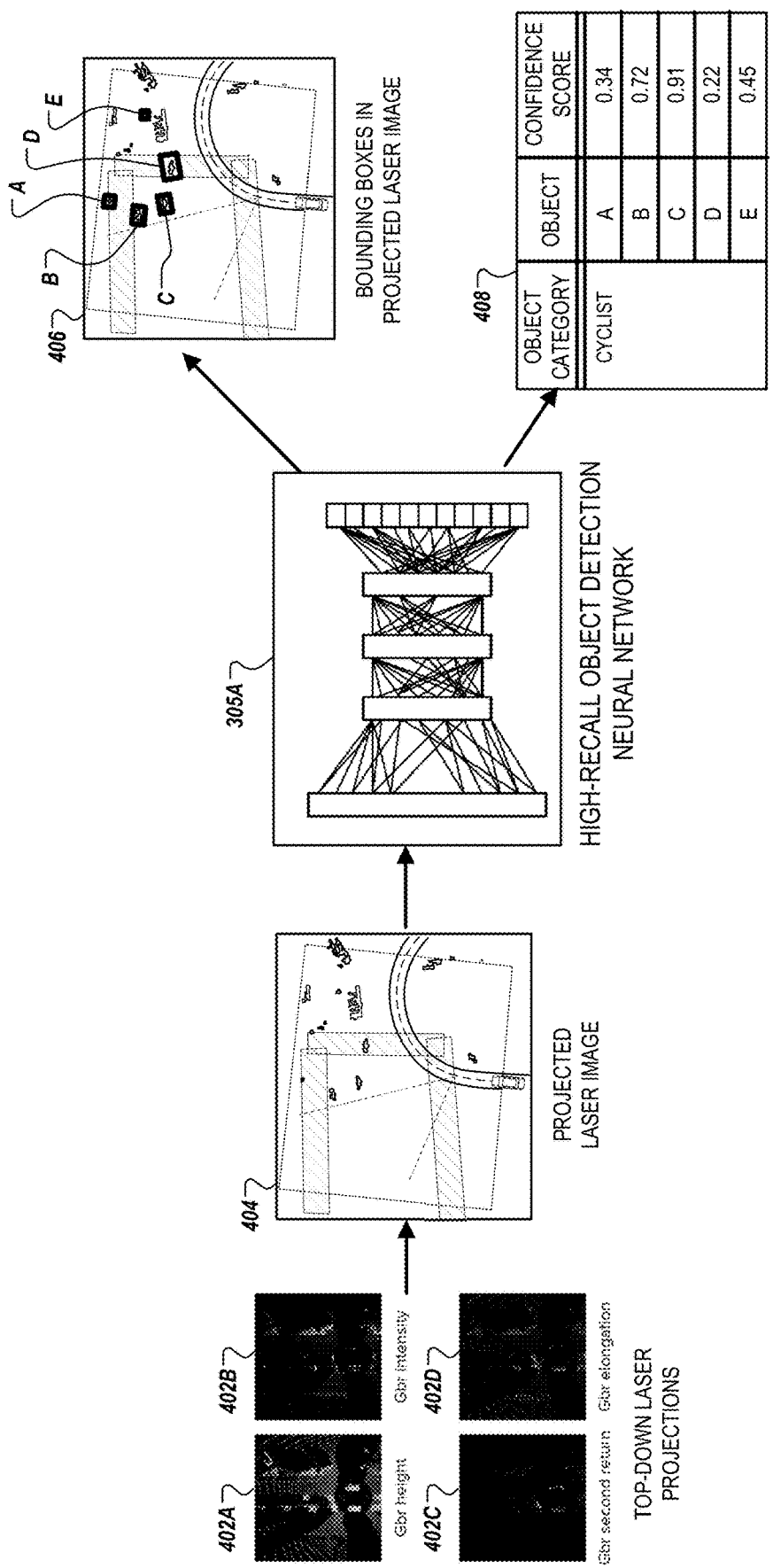
FIG. 4A is a schematic diagram of an example of processing a projected laser image of an environment to generate bounding boxes that represent detected objects in the projected laser image.

The system processes the laser projections and the camera image (220). For example, as illustrated in FIG. 3A, a high-recall neural network 305A processes the laser projections to generate a projected laser image 302A. FIG. 4A illustrates the process for processing the laser projections to generate the projected laser image 302A. In addition, a high-recall neural network 305B processes the camera image to generate a camera image patch 302B. The projected laser image 302A, the camera image input 302B, and an associated feature vector 302C are then provided as input 302 to the high-precision object neural network 310.

As described above, in some implementations, the input 302 is generated based on the output of one or more of multiple high-recall object detection neural networks, which process raw sensor data 301 collected by the laser and camera sensors of an autonomous vehicle. Each of the multiple high-recall object detection neural networks are trained to process a certain type of sensor data collected by the sensor subsystem of an autonomous vehicle.

Figure 4B:
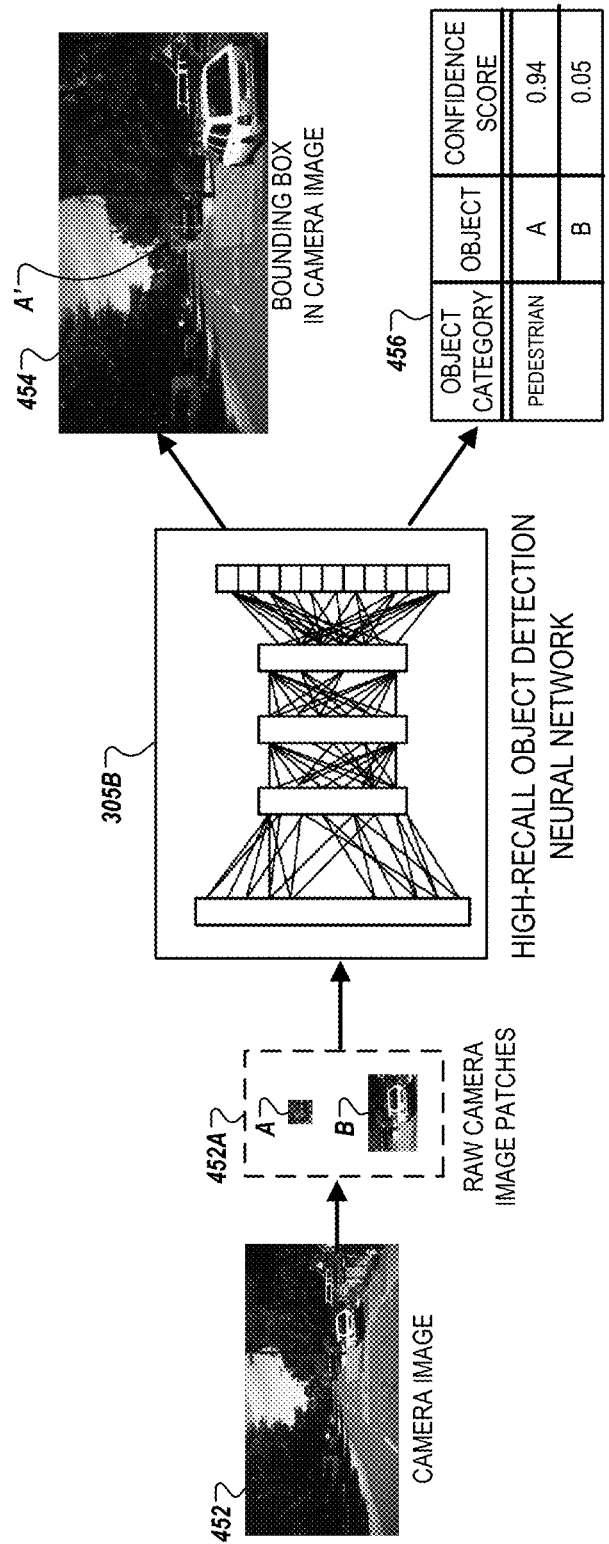
FIG. 4B illustrates an example of processing a camera image of an environment to generate bounding boxes that represent detected objects in the projected laser image.

For example, as illustrated in FIG. 4A, a first high-recall object detection neural network 305A can be used to process a projected laser image 404 generated from a set of top-down laser projections 402A-D. The high-recall object detection neural network 305A can be used to identify candidate regions within the projected laser image 404 that are predicted to include objects. In another example, as illustrated in FIG. 4B, a high-recall object detection neural network 305B processes a camera image 452. The high-recall object detection neural network 305B can be used to generate camera image patches corresponding to objects detected within the environment represented within the camera image 452.

The candidate regions within the projected laser image and the camera that are identified by the high-recall object detection neural networks 305A and 305B, respectively, can then be used to generate the input 302. In some implementations, the candidate regions are used to extract portions of the projected laser image and the camera image that are determined to have a high likelihood of including an object of interest, and discard other portions of the projected laser image and the camera image patch. Thus, as described in more detail in FIG. 3A, the output of the high-recall object detection neural networks 305A and 305B are used to generate the input that is processed by the system.

In some implementations, the sensor data 301 includes both long-range laser data collected by a long-range laser sensor and short-range laser data collected by a short-range laser sensor. For example, the sensor subsystem of the autonomous vehicle can include both long-range and short-range laser sensors that capture laser data from short-range regions (e.g., less than 40 meters from the vehicle) and long-range regions (e.g., up to 80 meters from the vehicle). In such implementations, the long-range and short-range sensor data are processed using two separate high precision object detection neural networks, e.g., a long-range high precision object detection neural network and a short-range high precision object detection neural network. An example of a neural network architecture for such implementation is discussed below with respect to FIG. 3B.

In some implementations, the architecture 300A receives sensor data 301 that includes both long-range laser sensor data and short-range laser sensor data, but only one high precision object detection neural network is used to process short-range laser sensor data only. In such implementations, the long-range sensor data is used only to generate the input components of the input 302, but not processed by the high precision object detection neural network 310.

The system obtains an input characterizing a first region of an environment (230). For instance, as illustrated in FIG. 3A, the input 302 can include the projected laser image 302A, a camera image patch Details relating to the projected laser image, the camera image patch, and the feature vector are described below in FIGS. 3A, 3B, 4A, and 4B.

The system processes the input using a high precision object detection neural network (240). As described above, the input processed by using the high precision object detection neural network is generated based on the output of multiple high-recall object detection neural networks, e.g., the high-recall object detection neural networks 305A and 305B. The components of the input, e.g., the projected laser image, the camera image patch, and the feature vector, are then processed using a high precision object detection neural network.

As illustrated in FIG. 3A, the high precision object detection neural network includes multiple sub-neural networks that are each trained to process a respective input component. For example, a high precision object detection neural network can include a laser sub-neural network 310A that processes a projected laser image 302A, a camera sub-neural network 310B that processes a camera image patch 302B, and a feature sub-neural network 310C that processes a feature vector 302C.

The feature vector 302C encodes context information, e.g., distance between the autonomous vehicle and the road edge, that characterizes the environment. In some instances, the feature vector 302C encodes context information that is captured independently from the data captured by laser sensors and the camera sensors. For example, the feature vector 302C can include context information that is obtained using data collected by other sensors and/or data obtained from external information sources.

As described in more detail below, the sub-neural networks 310A, 310B, and 310C each process a corresponding input component to generate alternative representations of the corresponding input component. The alternative representations are tensors, i.e., one-dimensional or multi-dimensional arrays, that represent the corresponding input. For example, the alternative representations may have predetermined dimensions that are associated with the corresponding input.

The system processes the alternate representations of the projected laser image, the camera image patch, and the feature vector through a combining sub-neural network (250). For example, as illustrated in FIG. 3A, the alternative representations 304A, 304B, and 304C are provided as input to a combining sub-neural network 310D. The combining sub-neural network 310D can include one or more visual combining neural network layers to generate visual combined representations of the processed project laser image and the processed the camera image patch. The visual combined representation and the alternative representation of the feature vector are then processed by one or more final combining layers to generate a final combined representation, which is used to generate object scores for objects detected within the visual combined representation.

The system generates a respective score for each object category in a set of one or more object categories from the alternative representations (260). The high precision object detection neural network may compute a respective object score for each object category in a set of one or more object categories. Each object score represents a respective likelihood that an object belonging to the object category is located in the first region of the environment. For example, an object score can be computed for each object category. The object score for a particular object category represents a likelihood that an object in a particular object category is detected within the projected laser image and/or the camera image patch. Detailed descriptions related to computing object scores are provided in FIGS. 4A and 4B, respectively.

FIG. 3A is a schematic diagram of an example of an architecture 300A of a high precision object detection neural network 310. In general, the high precision object detection neural network 310 receives input data 302 that includes a projected laser image 302A, a camera image patch 302B, and a feature vector 302C. The high precision object detection neural network 310 processes the input data 302 using multiple sub-neural networks 310A, 310B, 310C, and 310C to generate output data 308 that includes object scores for different object categories.

In more detail, raw sensor data 301 collected by laser sensors and camera sensors are initially pre-processed and analyzed using multiple high-recall neural networks that identify objects of interest detected within the sensor data 301. For instance, as described in more detail below in FIGS. 4A and 4B, the output of the high-recall neural networks identifies candidate regions that are predicted to include detected objects. The candidate regions are then used to generate the projected laser image 302A and the camera image patch 302B that are included within the input 302.

Figure 3B:
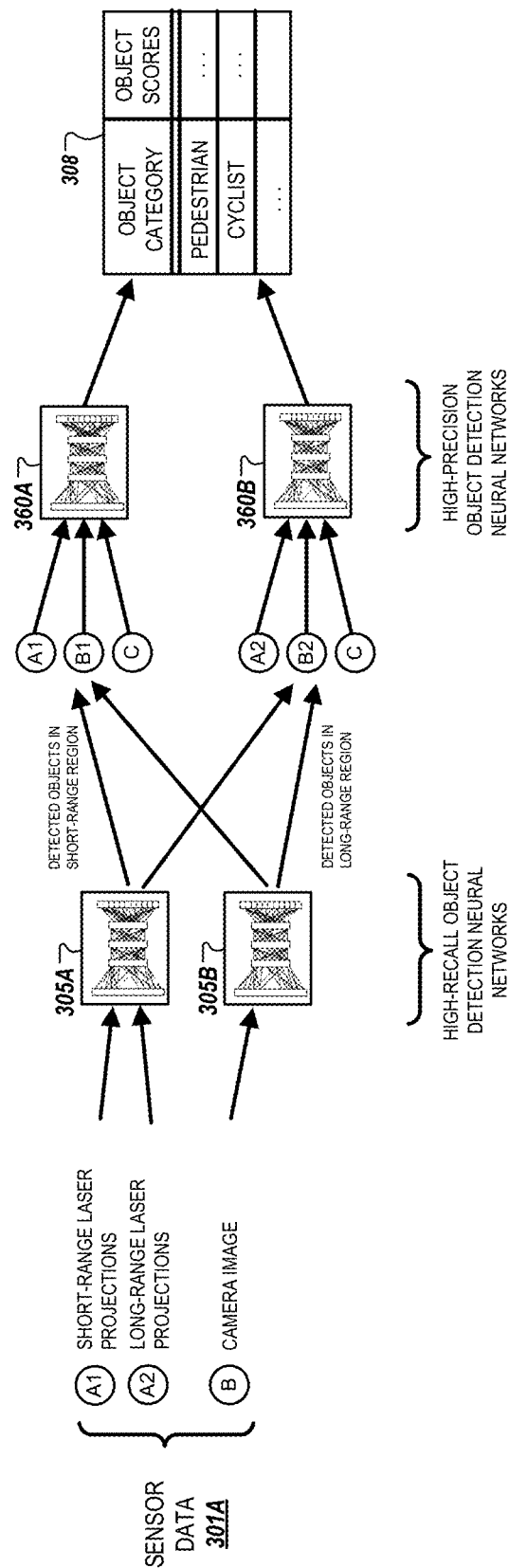
FIG. 3B is a schematic diagram of an example of an architecture of a high precision object detection neural network that processes long-range and short-range sensor data.

For example, as illustrated in FIG. 4A, a set of top-down laser projections generated from data collected by laser sensors are pre-processed and then provided as input to a high-recall laser neural network 305A in order to generate the projected laser image 302A. In addition, as illustrated in FIG. 4B, a camera image is similarly provided as input to a high-recall camera neural network 305B in order to generate the camera image patch 302B. In some implementations, the laser and camera data may include objects detected in both long-range and short-range regions. In such implementations, multiple high-precision object detection neural networks can be used to process data for objects detected in the long-range and the short-range regions as illustrated in FIG. 3B.

The projected laser image 302A, the camera image patch 302B, and the feature vector 302C are provided as respective input to a laser sub-neural network 310A, a camera sub-neural network 310B, and a feature sub-neural network 310C. The laser sub-neural network 310A, the camera sub-neural network 310B, and the feature sub-neural network 310C then provide alternative representations of the projected laser image 302A, the camera image patch 302B, and the feature vector 302C as output to the combining sub-neural network 310D. As described above, the alternative representations 304A, 304B, and 304C are tensors, i.e., a single-dimensional or multi-dimensional array, with predetermined dimensions that represent the corresponding input associated with the processed projected laser image 302A, the camera image patch 302B, and the feature vector 302C.

The laser sub-neural network 310A and the camera sub-neural network 310B both include stacks of convolutional neural network layers and, optionally, one or more other kinds of neural network layers, e.g., pooling layers, normalization layers, batch normalization layers, among others. The feature sub-neural network 310C is a stack of fully-connected layers that process the feature vector 302C to generate the alternative representation 304C.

Once generated, the alternative representations 304A, 304B, and 304C are provided as input to a combining sub-neural network 310D, which then generates the output data 308 including object scores for each category of objects. The combining sub-neural network 310D includes multiple neural network layers for combining the alternative representations 304A, 304B, and 304C.

In some implementations, the combining sub-neural network 310D may include one or more visual combining neural network layers to generate a visual combined representation of the alternative representation 304A and the alternative representation 304B. In particular, in some implementations, the visual combining layers include a depth concatenation layer followed by one or more fully-connected layers. A depth concatenation layer takes as input two or more tensors, e.g., the alternative representations of the alternative representation 304A and the alternative representation 304B and concatenates the input tensors in the depth dimension. This operation can be described as "stacking" the input tensors to generate a new tensor The combining sub-neural network 310D may also include one or more final combining layers to generate a final combined representation based on processing the visual combined presentation and the alternative representation 304C. The final combining layers may include a depth concatenation layer followed by one or more fully connected layers.

The combining sub-neural network 310D then processes the final combined representation can through an output neural network layer to generate the object scores that are included within the output data 308.

FIG. 3B is a schematic diagram of an example of an architecture 300B of a high precision object detection neural network that processes long-range and short-range sensor data. Compared to the architecture 300A illustrated in FIG. 3A, which processes either long-range or short-range data only, the architecture 300B can optionally be used in implementations where the sensor subsystem of an autonomous vehicle includes both long-range and short-range laser sensors.

In such implementations, the sensor data 301A can include short-range laser projections, long-range laser projections, and a camera image. The short-range and long-range laser projections can be pre-processed and provided as input to the high-recall laser neural network 305A as described above with respect to FIG. 3A. The camera image is also similarly processed using the high-recall camera neural network 305B described above.

The output of the high-recall object detection neural networks 305A and 305B are then separated based on the region of the environment where an object is detected and for processing using a corresponding high-precision object detection neural network. This technique is optionally used if objects are detected within both the long-range region and the short-range region of the environment that is captured within the camera image. For instance, if objects are only detected within the short-range region of the environment within the camera image, then only the high precision object detection neural network 360A is used to process an input that includes a short-range projected laser image, a camera image patch of the detected object in the short-range region, and a feature vector in a manner similar to that described above in FIG. 3A. Alternatively, if only objects are detected within the long-range region of the environment within the camera image, then only the high precision object detection neural network 360B is used to process an input that includes a long-range projected laser image, a camera image patch of the detected object in the long-range region, and a feature vector in a similar manner to that described above in FIG. 3B.

In implementations where objects are detected in both the short-range and the long-range region of the environment within the camera image, the system separates the output of the high-recall neural networks 305A and 305B. Thus, short-range projected laser images, camera image patches for objects detected in the short-range region of the environment, and feature vectors are provided as input to the high precision object detection neural network 350A, whereas long-range projected laser images, camera image patches for objects detected in the long-region of the environment, and feature vectors are provided as input to the object detection neural network 360A. The output of the high precision object detection neural networks 360A and 360B are then combined to generate the output data 308 as described above in FIG. 3A.

FIG. 4A is a schematic diagram of an example of processing a projected laser image 404 of an environment to generate bounding boxes that represent detected objects in the projected laser image. A high-recall object detection neural network 305A305A that is trained to detect objects within a laser project image 404 is used to generate a processed laser projected image 406 that includes bounding boxes for candidate regions of the laser projected image 404 that are predicted to include objects from specified object categories.

In general, the projected laser image 404 can be generated by combining top-down projections 402A, 402B, 402C, and 402D for different channels of laser input data. The same or similar projections can be used for other kinds of electromagnetic radiation. Each of the top-down projections 402A-D of a different channel of input sensor data onto a plane that is substantially parallel to the road on which the vehicle is traveling. The vehicle recording the input data is thus located substantially in the middle of each image.

Various types of laser sensors can be used to capture the top-down laser projections described above. In some implementations, a short-range laser sensor can be used to collect sensor data up to 40 meters around the vehicle. For example, a laser sensor can be used to detect the ground surrounding the autonomous vehicle and nearby objects. In other implementations, a long-range laser sensor can be used to collect sensor data up to 80 meters around the vehicle. For example, a long-range laser sensor can be used to detect long-range objects that are not detectable by the short-range laser sensors.

In some implementations, a combination of laser sensors (e.g., short-range and long-range sensors) can be used in conjunction to simultaneously detect both long-range and short-range data.

As illustrated, a first top-down projection 402A is a projection of a height channel that indicates a distance from the vehicle for each tallest object. The intensities of the top-down projection are, however, all uniform. When tall objects are near the vehicle, the top-down projection of the height channel data includes large regions of empty space. In addition, the top-down projection of the height channel data may include regions in which no data was recorded. In the top-down projection, the concentric circles and parallel lines represent regions of space that were swept by a laser, but which generated no reflections. The system can include these visual features only in user-interface presentations for clarity, and need used them for making full-vehicle predictions.

A second top-down projection 402B is a projection of an intensity channel. The top-down projection indicates multiple objects for some lines of sight around the vehicle, and for each object, a distance and a relative intensity.

A third top-down projection 402C is a projection of a second return channel. The top-down projection indicates a distance from the vehicle of second returns for each direction around the vehicle. In this example, the second returns are likely to be car exhaust.

A fourth top-down projection 402D is a projection of an elongation channel. The top-down projection indicates lines along which many reflections were received, which are likely to be due to vegetation.

Once the projected laser image 404 is generated based on combining the individual top-down laser projections discussed above, the projected laser image 404 is provided as input to the high-recall object detection neural network 305A. The high-recall object detection neural network 305A is trained to identify regions within the projected laser image 404 that are likely to include an object associated with an object category. As described above, examples of object categories include pedestrians, cyclists, or other vehicles near the vicinity of the vehicle as it travels on a road.

In some implementations, the top-down projections, or the projected laser image 404, can be processed prior to being sent as input to the high-recall object detection neural network 305A. For example, the projected laser image 404 can be normalized using different techniques based on the features to be analyzed by the high-recall object detection neural network 305A.

The high-recall object detection neural network 305A is trained to identify candidate regions within the projected laser image 404 that are predicted to include specific objects of interest using regression techniques. The high-recall object detection neural network 305A then generates bounding boxes that specify the boundaries of the candidate regions. The classification techniques used by the high-recall object detection neural network 305A enable the generation of bounding boxes in different regions of the projected laser image, and with different shapes (e.g., width, height, rotation angle).

The high-recall object detection neural network 305A also computes confidence scores for each detected object within the projected laser image 404. The value of a respective confidence score reflects a likelihood that a detected object belongs to an object category. In some instances, the high-recall object detection neural network 305A is capable of generating small bounding boxes based on limited sensor data available for a particular region (e.g., a 3×3 pixel bounding box). An example of an architecture for the high-recall object detection neural network 305A is the "DeepMultiBox" deep neural network described by Erhan et al. in a research publication titled "Scalable Object Detection using Deep Neural Networks," available at https://pdfs.semanticscholar.org/0674/792f5edac72b77fb1297572c15b153576418.pdf.

In some implementations where the laser sub-neural network 310A is configured to identify multiple object categories, the high-recall object detection neural network 305A may compute respective confidence scores for each object category for a given detected object. In this regard, the high-recall object detection neural network 305A may compare the values of the respective confidence scores to classify a detected object from among multiple object categories.

In the example depicted in FIG. 4A, the high-recall object detection neural network 305A identifies five bounding boxes within the processed laser projected image 404 corresponding to detected objects labelled as "A," "B," "C," "D," and "E" in the figure. The high-recall object detection neural network 305A also computes confidence scores for each object for a "CYCLIST" object category, which are included in table 408. As depicted, high-recall object detection neural network 305A computes the highest confidence score for objects "C" and "B," indicating that these objects are most likely to represent a cyclist in the vicinity of the vehicle. In contrast, the high-recall object detection neural network 305A computes the lowest confidence score for object "D," indicating that this object is either an object associated with a different object category, e.g., a pedestrian or a vehicle, a falsely detected object.

The regions of the projected laser image 406 that are determined to include the objects A-E are then correlated with objects detected within a camera image of the environment as described below with respect to FIG. 4B. For instance, corresponding regions in the camera image for the objects A-E detected within the projected laser image 406 are identified and extracted. In this regard, the input 302 that is provided to the high precision object detection neural network 310 includes corresponding regions of the projected laser image and the camera image patch.

In addition, the regions of the projected laser image 406 that are determined to include the objects A-E are also used generate the projected laser image 302A. For example, in some implementations, the regions of the projected laser image 406 that include objects A-E can be extracted whereas the other portions of the projected laser image 406 can be discarded so that only the portions of the projected laser image 406 are determined to have a high likelihood of including an object of interest are processed by the laser sub-neural network 310A.

FIG. 4B is a schematic diagram of an example of processing a camera image 452 of an environment to generate bounding boxes that represent detected objects in the camera image 452. As discussed above, a high-recall object detection neural network 305B that is trained to detect objects within a camera image 452 is used to generate a processed camera image 454 that includes bounding boxes for candidate regions of the camera image 452 that are predicted to include one or more objects from one or more specified object categories. The bounding boxes are then used to identify regions of the camera image that include objects detected by the high-recall object detection neural network 305B.

In general, the camera image 452 is initially pre-processed to extract a set of raw camera image patches 452A. As described above, each camera image patch refers to, e.g., a randomly-selected region or a region selected using other criteria by an external process, of the camera image 452 that is within the field of view of the camera capturing the camera image 452. For example, each camera image patch represents a collection of pixels within the camera image 452 that are extracted based on a particular patch size. In some instances, multiple collections of camera image patches of different sizes are extracted from various regions of the camera image 452 (e.g., a collection ten-by-ten pixel patches and a collection of twenty-by-twenty pixel patches) such that the entire field of view of the camera image 542 is represented within the collections of the image patches. The set of raw camera image patches 452A can be extracted using any suitable image processing techniques and camera calibration information.

In the example depicted, two raw camera image patches A and B are extracted from the camera image 452, e.g., a camera image patch that includes a white vehicle nearby in the bottom right of the camera image 452, and an another camera image patch that includes an individual exiting a parked truck in front of the white truck.

The set of raw camera image patches 452A are then provided as input to the high-recall object detection neural network 305B. The high-recall object detection neural network 305B identifies candidate regions within the camera image 452 (e.g., regions within the camera image patches) that are determined to include an object associated with one or more object categories. The high-recall object detection neural network 305B is generally trained to identify and verify objects within the set of range-normalized camera image patches 452B that are provided as input. The detected objects and their computed confidence scores are included in a table 456.

The camera image patches that are determined by the high-recall object detection neural network 305B are then processed to generate a set of range-normalized camera image patches. For instance, the candidate images of the camera image patches are initially projected back into a three-dimensional coordinate system of the camera image 454.

For instance, the camera's field of view is initially calibrated to identify a three-dimensional coordinate system that correlates a point within the camera image 452 to a physical location within the region of the environment that is captured within the camera image 452. For example, the three-dimension coordinate system enables the camera, or any other post-processing device, to identify an object within the camera image 452 and a corresponding range value representing a distance between the vehicle and the physical location of the object in the region of the environment that is captured within the camera image 452. In another example, the three dimensional coordinate system enables the camera or the post-processing device to identify a three-dimensional coordinate for a detected object, e.g., x, y, and z coordinates corresponding to the object's physical location within the region of the environment captured in the camera image 452. These three-dimensional coordinates can then be correlated with a two-dimensional coordinates representing the locations of pixels associated with the object within the camera image 452.

The set of camera image patches that include objects are adjusted using the computed range values corresponding to predicted objects within a raw camera image patch to generate a set of range-normalized camera image patches that each include adjusted camera image patches corresponding to detected objects. As discussed above, a range value can be used to represent a distance between the vehicle and a physical location of a given within the region of the environment that is captured within the camera image 452. Thus, the size of camera image patches for objects that are further away from the vehicle are smaller than the size of camera image patches for objects that are closer to the vehicle.

The range normalized camera image patches are generated such that the objects included within each of the camera image patches are substantially the same size. Thus, the raw camera image patches are resized such that the each of the camera image patches within the range normalized camera image patches are roughly the same size. This reduces potential object classification inaccuracies in the "high-precision" stage by the camera sub-neural network 310B as illustrated in FIG. 3A.

The locations of the bounding boxes within the environment of the camera image 454 can then be used to determine if a detected object is within a short-range region of the environment or a long-range region of the environment. Thus, the location of the generated bounding box is used to determine the corresponding projected laser image to provide as input to a high precision object detection neural network as described above. For example, as described above, the coordinate system associated with the camera image can be used to identify a range value associated with the detected object, which is then used to determine whether the object is in a long-range or a short-range region of the environment.

In some implementations, where the system collects both long-range and short-range sensor data, the location of the bounding box can therefore be used to determine whether to provide input to either the high precision object detection neural network 360A or 360B as described above with respect to FIG. 3B. The location of the bounding boxes can also be used to generate either a long-range projected laser image or a short-range projected laser corresponding to the region containing the bounding box. For example, if a location of a bounding box indicates that the detected object is located within a short-range region of the environment, a corresponding short-range laser projection image may be generated. Alternatively, if a location of a bounding box indicates that the detected objected is located within a long-range region of the environment, a corresponding long-range laser projection image may be generated.

In the example depicted, of the two objects initially detected, the high-recall object detection neural network 305B only identifies a bounding box within the processed camera image 454 for the camera image patch A of the individual exiting the parked truck, but not for the camera image patch B of the white vehicle. In this example, the high-recall object detection neural network 305B is trained to identify objects that are a part of the object category "PEDESTRIAN." Because the confidence score computed for the camera patch A is lower than a threshold, the high-recall object detection neural network 305B disregards the white vehicle as not being included in the "PEDESTRIAN" class, and therefore only generates a bounding box for the individual exiting the truck as illustrated.

In some implementations, the high-recall object detection neural network 305B may identify objects within the entire camera image 452 instead of the set of range-normalized camera image patches 452B as illustrated in the figure. In such implementations, the camera image 452 may be provided as input to the high-recall object detection neural network 305B, which then identifies candidate regions with bounding boxes within the camera image 454 using similar objection recognition and detection techniques as described above. In addition, camera image patches corresponding to bounding boxes may be extracted from the camera image 454 and then provided as input 302B to the high precision object detection neural network 310 as illustrated in FIG. 3A.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   processing, by one or more computers, a first input generated from first sensor data collected by one or more first sensors of a vehicle using a first high-recall object detection neural network, wherein the first sensor data characterizes an environment in a vicinity of the vehicle, and wherein the first high-recall object detection neural network is configured to:
      receive the first input; and
      process the first input to generate:
         for each of a plurality of bounding boxes that each correspond to a respective region of the environment, a respective first confidence score that represents a probability that an object is present in the region of the environment corresponding to the bounding box;
   selecting, based at least on the respective first confidence scores, a first region of the environment corresponding to a first bounding box of the plurality of bounding boxes;
   in response to selecting the first region:
      obtaining, by the one or more computers, a second input characterizing the first region of the environment, wherein the second input is different from the first input and is generated from second sensor data collected by a different, second set of sensors than the first input, the different, second set of sensors comprising the one or more first sensors and at least one additional sensor that is of a different type than that of the one or more first sensors; and
      processing, by the one or more computers, the second input using a high precision object detection neural network to generate a respective object score for each object category in a set of one or more object categories, wherein each object score represents a respective probability that an object belonging to the object category is present in the first region of the environment.

2. The method of claim 1, wherein the one or more first sensors comprise a single camera sensor of the vehicle, and wherein the one additional sensor that is of a different type than that of the one or more first sensors comprises a laser sensor of the vehicle.

3. The method of claim 1, further comprising:
   processing, by one or more computers, a third input generated from third sensor data collected by one or more third sensors of the vehicle using a third high-recall object detection neural network, wherein the third sensor data characterizes the environment in the vicinity of the vehicle, and wherein the third high-recall object detection neural network is configured to:
      receive the third input; and
      process the third input to generate:
         for each of the plurality of bounding boxes, a respective third confidence score that represents a probability that an object is present in the region of the environment that shows the bounding box.

4. The method of claim 3, wherein selecting the first region is based on the first confidence score for the first bounding box and the third confidence score for the first bounding box.

5. The method of claim 3, wherein the one or more first sensors are different from the one or more third sensors.

6. The method of claim 5, wherein the second set of sensors include the first sensors and the third sensors.

7. The method of claim 1, wherein the first high-recall object detection neural network generates data identifying the plurality of bounding boxes.

8. The method of claim 1, wherein generating the second input comprises:
   generating, from the second sensor data, one or more projected laser images characterizing the first region of the environment.

9. The method of claim 1, wherein generating the second input comprises:
   generating, from the second sensor data, one or more camera image patches corresponding to the first bounding box for the first region of the environment.

10. The method of claim 1, wherein generating the second input comprises:
generating a feature vector of features that comprises context information characterizing the first region of the environment.

11. A system comprising:
one or more computers; and
a non-transitory computer-readable medium coupled to the one or more computers having instructions stored thereon, which, when executed by the one or more computers, cause the one or more computers to perform operations comprising:
processing, by one or more computers, a first input generated from first sensor data collected by one or more first sensors of a vehicle using a first high-recall object detection neural network, wherein the first sensor data characterizes an environment in a vicinity of the vehicle, and wherein the first high-recall object detection neural network is configured to:
receive the first input; and
process the first input to generate:
for each of a plurality of bounding boxes that each correspond to a respective region of the environment, a respective first confidence score that represents a probability that an object is present in the region of the environment corresponding to the bounding box;
selecting, based at least on the respective first confidence scores a first region of the environment corresponding to a first bounding box of the plurality of bounding boxes;
in response to selecting the first region:
obtaining, by the one or more computers, a second input characterizing the first region of the environment, wherein the second input is different from the first input and is generated from the second sensor data collected by a different, second set of sensors than the first input, the different, second set of sensors comprising the one or more first sensors and at least one additional sensor that is of a different type than that of the one or more first sensors; and
processing, by the one or more computers, the second input using a high precision object detection neural network to generate a respective object score for each object category in a set of one or more object categories, wherein each object score represents a respective probability that an object belonging to the object category is present in the first region of the environment.

12. The system of claim 11, wherein the one or more first sensors comprise a single camera sensor of the vehicle, and wherein the one additional sensor that is of a different type than that of the one or more first sensors comprises a laser sensor of the vehicle.

13. The system of claim 11, further comprising:
processing, by one or more computers, a third input generated from third sensor data collected by one or more third sensors of the vehicle using a third high-recall object detection neural network, wherein the third sensor data characterizes the environment in the vicinity of the vehicle, and wherein the third high-recall object detection neural network is configured to:
receive the third input; and
process the third input to generate:
for each of the plurality of bounding boxes, a respective third confidence score that represents a probability that an object is present in the region of the environment that shows the bounding box.

14. The system of claim 13, wherein selecting the first region is based on the first confidence score for the first bounding box and the third confidence score for the first bounding box.

15. The system of claim 13, wherein the one or more first sensors are different from the one or more third sensors.

16. The system of claim 15, wherein the second set of sensors include the first sensors and the third sensors.

17. The system of claim 11, wherein the first high-recall object detection neural network generates data identifying the plurality of bounding boxes.

18. A non-transitory computer storage device encoded with a computer program, the program comprising instructions that when executed by one or more computers cause the one or more computers to perform operations comprising:
processing, by one or more computers, a first input generated from first sensor data collected by one or more first sensors of a vehicle using a first high-recall object detection neural network, wherein the first sensor data characterizes an environment in a vicinity of the vehicle, and wherein the first high-recall object detection neural network is configured to:
receive the first input; and
process the first input to generate:
for each of a plurality of bounding boxes that each correspond to a respective region of the environment, a respective first confidence score that represents a probability that an object is present in the region of the environment corresponding to the bounding box;
selecting, based at least on the respective first confidence scores a first region of the environment corresponding to a first bounding box of the plurality of bounding boxes;
in response to selecting the first region:
obtaining, by the one or more computers, a second input characterizing the first region of the environment, wherein the second input is different from the first input and is generated from second sensor data collected by a different, second set of sensors than the first input, the different, second set of sensors comprising the one or more first sensors and at least one additional sensor that is of a different type than that of the one or more first sensors; and
processing, by the one or more computers, the second input using a high precision object detection neural network to generate a respective object score for each object category in a set of one or more object categories, wherein each object score represents a respective probability that an object belonging to the object category is present in the first region of the environment.

* * * * *